US012764655B2

(12) United States Patent
Hathi et al.

(10) Patent No.: US 12,764,655 B2
(45) Date of Patent: Oct. 13, 2026

(54) PRO-ACTIVE ENERGY SAVING IN AN ACCESS POINT DEVICE

(71) Applicant: Arista Networks, Inc., Santa Clara, CA (US)

(72) Inventors: Preyas Satish Hathi, Pune (IN); Nadeem Akhtar, Navi Mumbai (IN); Jatin Parekh, Mumbai (IN); Anubhav Gupta, Navi Mumbai (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 343 days.

(21) Appl. No.: 17/895,473

(22) Filed: Aug. 25, 2022

(65) Prior Publication Data

US 2024/0073811 A1 Feb. 29, 2024

(51) Int. Cl.
*H04W 52/02* (2009.01)

(52) U.S. Cl.
CPC ............................... *H04W 52/0206* (2013.01)

(58) Field of Classification Search
None
See application file for complete search history.

(56) References Cited

U.S. PATENT DOCUMENTS 6,584,330 B1 * 6/2003 Ruuska ............. H04W 52/0225 455/574
9,386,457 B2 * 7/2016 Yamazaki ............. H04L 5/0035
2005/0083999 A1 * 4/2005 Koo .................... H04W 52/367 375/148
2007/0002811 A1 * 1/2007 Faccin .................. H04W 48/08 370/338
2010/0246460 A1 9/2010 Kholaif et al.
2010/0284316 A1 * 11/2010 Sampathkumar ............................ H04W 52/0216 370/311
2012/0004009 A1 * 1/2012 Lindoff ............ H04W 52/0206 455/522
2012/0252479 A1 * 10/2012 Morita ................ H04W 52/143 455/452.2
2013/0058269 A1 * 3/2013 Xia ................... H04W 52/0206 370/311
2014/0036788 A1 * 2/2014 Ganu .................. H04W 52/367 370/329

(Continued)

FOREIGN PATENT DOCUMENTS

CN 103517389 A * 1/2014

OTHER PUBLICATIONS

English translation of CN 103517389 A (Year: 2014).*
European Patent Office, Extended European Search Report, EP App. No. 23193382.1, dated Feb. 5, 2024, 11 pgs.

*Primary Examiner* — Faruk Hamza
*Assistant Examiner* — Cassandra L Decker
(74) *Attorney, Agent, or Firm* — Fountainhead Law Group, PC

(57) ABSTRACT

A proactive energy-saving processing in an access point (AP) device is described. The AP monitors/computes usage/operating parameters (load factors) of the AP, and based on the obtained parameters, adjusts one or more AP operating parameters to reduce power consumption. The process is proactive in the sense that the current conditions in the AP do not require scaling back AP functionality. Nonetheless, the AP can scale back some functionality to reduce its power consumption, proactively, despite the absence of a need to do so.

24 Claims, 3 Drawing Sheets

(56) References Cited

U.S. PATENT DOCUMENTS

| | | | | |
|---|---|---|---|---|
| 2015/0200834 | A1* | 7/2015 | Yun | H04L 43/50 370/252 |
| 2015/0350933 | A1* | 12/2015 | Mannemala | H04W 76/18 370/225 |
| 2016/0150470 | A1* | 5/2016 | Fujishiro | H04W 52/0206 370/311 |
| 2017/0207956 | A1* | 7/2017 | Cabral | H04W 4/50 |
| 2017/0237480 | A1* | 8/2017 | Xu | H04B 7/0814 370/329 |
| 2018/0242169 | A1* | 8/2018 | Kowal | H04W 24/02 |
| 2018/0295528 | A1* | 10/2018 | Anantha | H04W 24/08 |
| 2018/0310133 | A1* | 10/2018 | Ramasamy | G01S 19/48 |
| 2020/0396580 | A1 | 12/2020 | Gilson et al. | |
| 2021/0058859 | A1 | 2/2021 | Henry et al. | |
| 2023/0099399 | A1* | 3/2023 | Branover | G06F 1/3206 713/323 |
| 2023/0199660 | A1* | 6/2023 | Yue | H04W 52/028 370/311 |
| 2023/0397101 | A1* | 12/2023 | Abotabl | H04W 72/1263 |

* cited by examiner

PRO-ACTIVE ENERGY SAVING IN AN ACCESS POINT DEVICE

BACKGROUND

A Wi-Fi AP (access point) operating in full-function mode, i.e., with all AP features running at their maximum potential, consumes maximum energy. Enterprises that deploy Wi-Fi networks incur a cost to operate their networks. Energy-saving measures can significantly lower operating costs for a network, while at the same time maintaining QoS (quality of service) to their customers.

An enterprise AP reduces some functionality or capacity typically in response to a reduced power grant from the PoE (Power over Ethernet) switch to which the AP is connected. In such cases, because the AP does not get enough power from the switch, it cannot operate in full-function mode and therefore it reduces its functionality or capacity.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
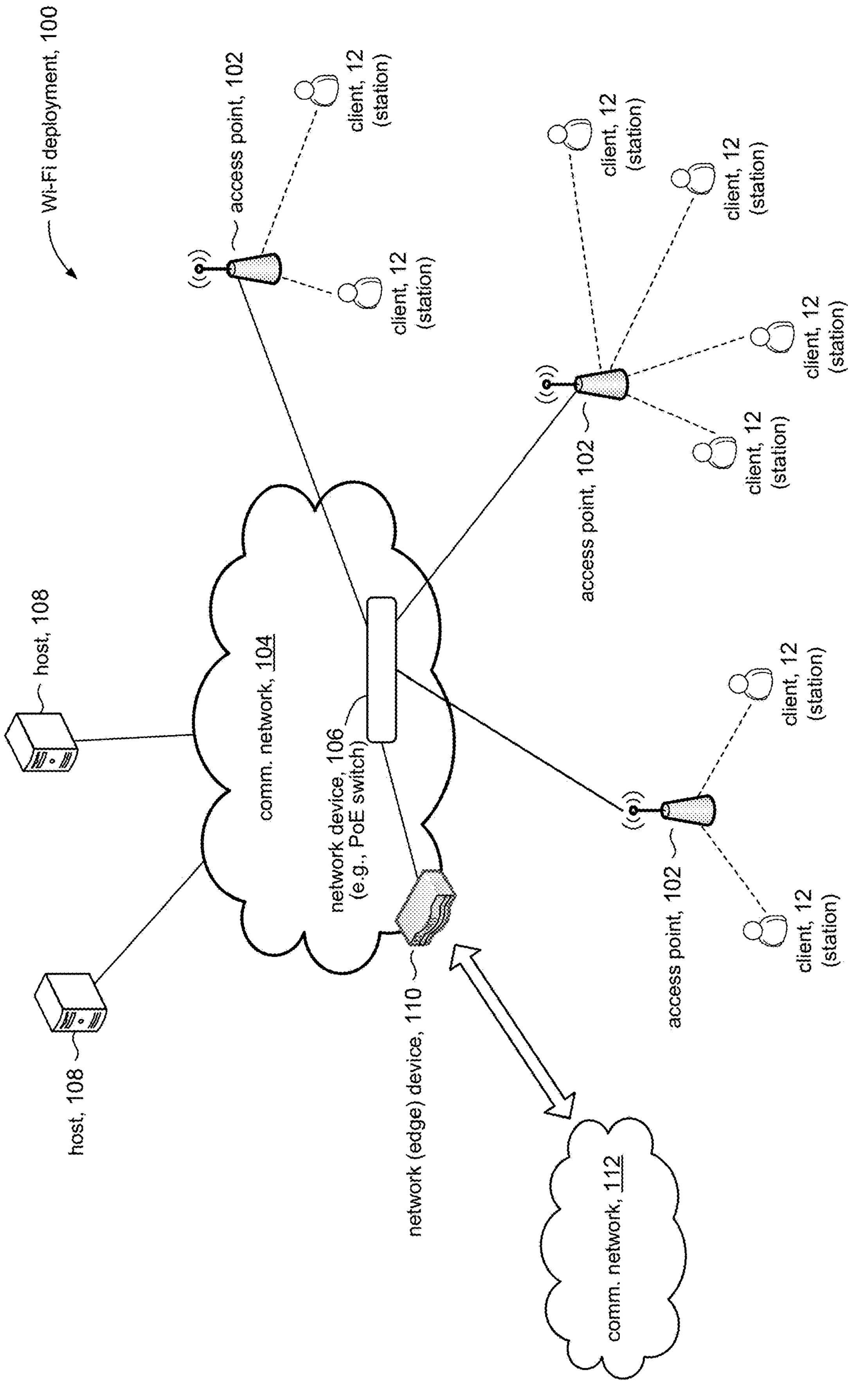
FIG. 1 depicts an illustrative deployment of APs (access points).

FIG. 1 is a diagrammatic representation of a deployment of APs (access points) in a Wi-Fi network, where one or more of the APs can be configured for operation in accordance with the present disclosure. In some embodiments, for example, deployment 100 can comprise APs 102 and host machines 108 (e.g., servers, desktop users, laptop users, etc.). Communication network 104 can comprise network devices 106 to which APs 102 and host machines 108 can be connected or otherwise be in communication with. Communication network 104 can further comprise one or more network devices 110 (also referred to as edge devices) to allow for communication between network devices 106 and other networks 112 such as a PSTN (public switched telephone network), other networks in an enterprise, the Internet, and so on.

APs 102 can be wireless communication devices that operate in accordance with the family of IEEE (Institute of Electrical and Electronics Engineers) 802.11 standards or 3GPP ($3^{rd}$ Generation Partnership Project) standards such as Long Term Evolution (LTE) and New Radio (NR). For discussion purposes, details of the present disclosure will use the technology of IEEE 802.11. However, it will be appreciated that one or more aspects of the present disclosure may be applicable to other wireless technologies. Clients (stations) 12 can associate with APs 102 in order to wirelessly communicate with other clients on the same or different AP, with host machines 108 on network 104, with communication network 112, and so on.

Figure 2:
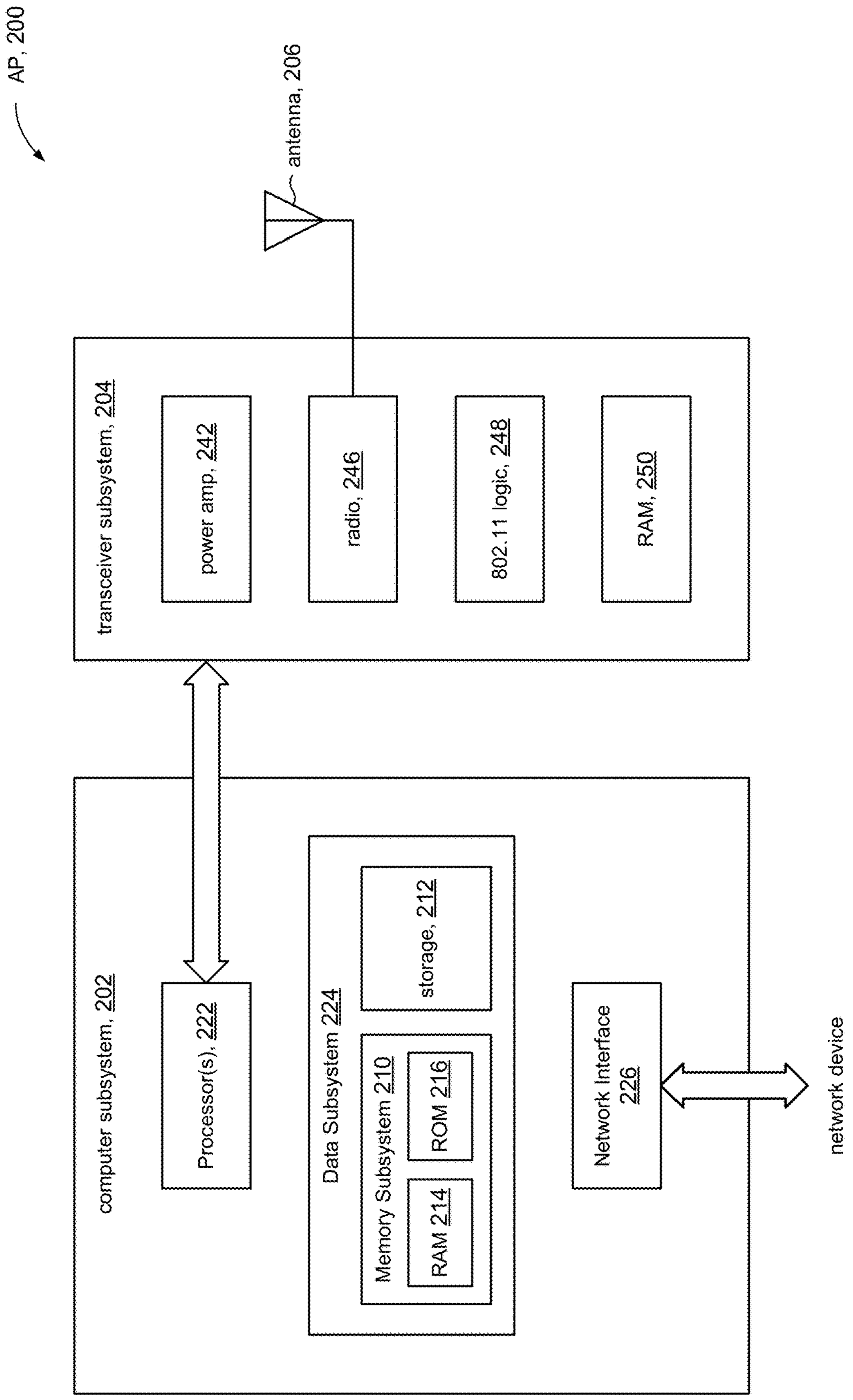
FIG. 2 shows an illustrative computing system adapted in accordance with the present disclosure.

FIG. 2 depicts a schematic block diagram of an AP 200 in accordance with some embodiments. AP 200 can be viewed as comprising computer subsystem 202, transceiver 204, and antenna 206. Computer subsystem 202 can include one or more processors 222, a data subsystem 224, and a network interface 226. Processor(s) 222 can be in communication with transceiver subsystem 204 to configure the transceiver and otherwise control operations of the transceiver. Data subsystem 224 can include memory subsystem 210 and storage subsystem 212. Memory subsystem 210 in turn can include memory components such as random access memory (RAM) 214 for storage of instructions and data during program execution, and read-only memory (ROM) 216 in which fixed instructions are stored. Storage subsystem 212 can provide persistent (i.e., non-volatile) storage for program and data files. Storage subsystem 212 can represent non-transitory computer-readable storage media to store program code and/or data, which when executed by computer subsystem 202, can cause the processors 222 to perform operations in accordance with embodiments of the present disclosure. Network interface subsystem 226 can serve as an interface for communicating data between AP 200 and other computer systems or networks, for example, network device 106 (FIG. 1).

Transceiver subsystem 204 can include a power amplifier 242, a radio component 246, IEEE 802.11 logic 248, and RAM 250. Power amplifier 242 can provide power to radio 246, for example, in order to transmit and receive signals via antenna 206. IEEE 802.11 logic 248 can comprise data processing elements such as an ASIC (application specific integrated circuit), FPGA (field programmable array), digital processing unit, and the like. Logic 248 can be configured to process signals (received or for transmission) in accordance with IEEE 802.11 standards. RAM 250 can provide buffers and other data structures to support the transmission and reception of data.

It is noted that AP 200 is illustrative. It will be appreciated that other embodiments of an AP in accordance with the present disclosure can include more or fewer components than are shown in FIG. 2.

Enterprises that deploy Wi-Fi networks incur a cost to operate these networks. Energy-saving (ES) measures result in significantly lower operating costs for a network and can reduce the carbon footprint, while maintaining the QoS. Conventional power saving strategies are "reactive." For example, in a configuration that uses PoE (power over Ethernet) switches (e.g., network device 106 in FIG. 1 can be a PoE switch) the switch may reduce the amount of power that is delivered to the AP. In response to the reduction in available power from the switch, the AP may react by scaling back some of its functionality (e.g., provide fewer functions, less capacity, etc.).

APs in accordance with the present disclosure can perform energy-saving (ES) measures in order to proactively lower operating costs. In lightly loaded conditions, for instance, the AP can reduce some of its functionality (e.g., operations, configurations, capacity, etc.) to save energy without compromising the QoS (quality of service) the AP provides to clients. For example, an AP that supports 4×4 parallel streams can reduce the number of supported simultaneous streams to 2×2 when the traffic load and number of clients are suitably low.

In some embodiments, the AP measures (samples) and computes usage and operating parameters (load factors) of the AP. Based on these parameters, one or more AP operating parameters can be proactively adjusted (turn OFF, scaled down) to enter an ES operating mode. Suppose, for example, that the amount of power currently being supplied to the AP does not require scaling back AP operations; for example, if the AP has sufficient power to operate at full functionality then there is no need to reduce its functionality for the purpose of saving power. However, based on the measured/computed parameters, the AP in accordance with the present disclosure may determine that it does not need to provide full functionality to maintain a certain QoS to its clients. As such the AP can "proactively" scale back AP operations for the purpose of reducing power usage without impacting QoS or without compromising on other quality metrics even though scaling back such operations is not required. By comparison, conventional energy management strategies maintain full function (and hence full power) operation in the AP irrespective of the operating environment such as number of clients, AP resources being used, network conditions, etc.

Various usage parameters relating to operation of the AP can contribute to the power load on the AP. Usage parameters can refer to the number of clients (stations) that are associated with the AP, radio usage, etc. Usage parameters can include buffer occupancy of the AP's uplink and downlink queues, utilization of an Ethernet link, channel utilization, and the like. In general, usage parameters can include any parameter pertaining to the utilization of the functionality of the AP in its performance of allowing Wi-Fi devices to connect to a wired network. Merely for discussion purposes, a non-exhaustive list of usage parameters in accordance with the present disclosure can include, but is not limited to:

- number of active clients (stations)—This parameter refers to the number of clients that are associated with the AP and are deemed "active." In some embodiments, a client can be deemed active based on the number of data units (bytes, packets, etc.) exchanged during a period of time.
- number of connected clients (stations) per radio—Some APs can be configured with multiple radios; e.g., 2.4 GHz radio, 5 GHz radio, etc. This parameter can refer to the number of clients that are active on a given radio.
- buffer occupancy—This parameter refers to the average size of all the data queues at the AP used to buffer uplink and downlink packets.
- Ethernet link utilization—This parameter refers to the average values of the uplink and downlink utilization of a given Ethernet link.
- self-channel utilization—This parameter refers to the utilization of a channel (transmit and receive activity) for a given period of time during which the radio occupied the channel to transmit and receive signals. Each radio in the AP is associated with a self-channel utilization metric.
- active features—Some protocol and software features (see below) can result in increased consumption of power when enabled.

Various operational aspects of the AP can be controlled to change the power consumed by the AP, whether to decrease power consumption (enter ES mode) or increase power consumption to resume full-function operation (i.e., exit ES mode). These control knobs can be tuned (e.g., increased, decreased, turned ON, turned OFF, etc.) to change the power consumption of the AP in response to changes in the usage parameters. Further in accordance with the present disclosure, the AP's environment (e.g., network conditions) can be monitored to identify opportunities for reducing power consumption.

Merely for discussion purposes, the following non-exhaustive listing of control knobs that can be used by embodiments in accordance with the present disclosure can include, but is not limited to:

- radio(s)—The one or more radios in the AP can be placed in the ON or OFF state. Turning OFF a radio can reduce power consumption, but at the cost of not being able to communicate with clients. This knob might nonetheless be used if the AP is configured with multiple radios and the ES measure is to turn OFF some but not all radios.
- USB (universal serial bus)—USB capability can be placed in the ON (enabled) or OFF (disabled) state. Disabling USB can save power, but at a cost of not being able to connect USB devices to the AP.
- BLE (Bluetooth low energy)—This is a feature that can be enabled to allow the AP to operate a Bluetooth or BLE radio.
- Tx/Rx chains—Each radio in an AP can have multiple (2, 4, 8, etc.) independent transmit/receive chains. This allows the AP to multiplex a signal across two or more chains, for example, to achieve higher throughput, to reduce errors, and so forth; likewise for receivers. In ES mode, the number of Tx/Rx chains on a radio can be adjusted to change power consumed by the radio; more chains require more power, fewer chains require less power.
- protocol/software features—Certain protocols or software features can impact how much power is consumed by the AP. Some features can be disabled to reduce power consumption; for example, scanning of the RF environment is a feature that can be turned off to reduce power. Other features can be tuned or adjusted to reduce power, but otherwise remain enabled. For example, in ES mode the number of Tx/Rx chains can be reduced in order to reduce power consumption without disabling communication altogether.
- Tx power—The transmit power for each radio can be adjusted to change the AP's power consumption while maintaining a desired level of coverage. In some embodiments, the power can be adjusted between a maximum transmit power level ($P_{max}$) and a minimum transmit power level ($P_{min}$). In some embodiments, the adjustments can be in 1 dB increments.
- PoE power request—In a configuration where the AP can draw power over its Ethernet connection to the switch (e.g., switch 106, FIG. 1), the AP can control how much power it draws from the switch. For example, the IEEE promotes standards for PSE's (power sourcing equipment) to supply different levels of power to a powered device such as an AP, including IEEE 802.3bt, IEEE 802.3at, and IEEE 802.3af. In some embodiments, for example, where the PSE supports multiple standards, the AP can draw more power or less power from the switch by negotiating in accordance with the supported standard. In some embodiments, the delivery of PoE power can be automatic or implicit in that when any of the other control knobs are adjusted, the AP can automatically choose to renegotiate the PoE power to reflect the change in energy consumption.

channel bandwidth—Bandwidth affects power; more bandwidth requires more power. The radios can be adjusted to transmit in narrower bandwidths to reduce power consumption. In some embodiments, bandwidths can be selected from 320/160/80/40/20 MHz.

Figure 3:
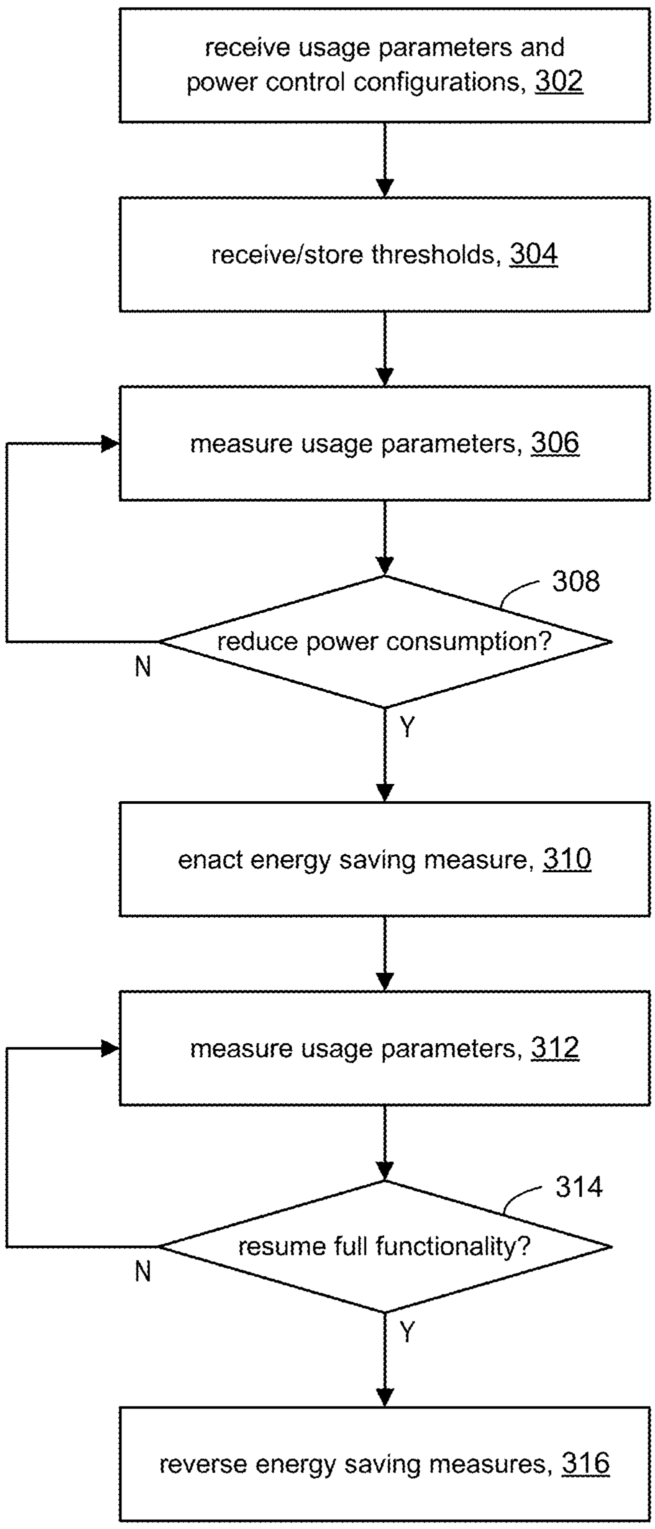
FIG. 3 is a high level flow chart that represents pro-active processing in accordance with the present disclosure to reduce power consumed by an AP.

Referring to FIG. 3, the discussion will now turn to a high level description of operations and processing by an AP (e.g., 102, FIG. 1) to reduce power consumption (ES operating mode or power-reduced mode) in accordance with the present disclosure. In some embodiments, for example, the AP can include non-transitory computer-readable storage media (e.g., storage subsystem 212, FIG. 2) to store program code and/or data, which when executed by one or more processors (e.g., 222, FIG. 2) in the AP, can cause the processors to perform processing in accordance with FIG. 3. The operation and processing blocks described below are not necessarily executed in the order shown. Operations can be combined or broken out into smaller operations in various embodiments. Operations can be allocated for execution among one or more concurrently executing processes and/or threads.

At operation 302, the AP can receive usage parameters and control knob configurations to configure proactive ES measures in accordance with the present disclosure. The usage parameters can be provided by a user (e.g., network administrator) or an automated system (e.g., central network controller) over a suitable interface. Any number and combination of usage parameters can be used as criteria for triggering ES measures.

The user can specify a control knob configuration to configure the above-described control knobs for ES mode operations. The configuration can specify limits or ranges for the control knobs. For instance, the user may impose a lower limit on the number of Tx/Rx chains, the user may impose a maximum limit on how much power can be requested from a PoE switch, and so on. In some deployments, some AP functions may be deemed to be sufficiently important that they should never be adjusted when looking to reduce power consumption. For example, control (ON/OFF) of radio functionality, Bluetooth usage, etc. may be disabled for purposes of power reduction because those functions may be deemed critical in a given deployment. Accordingly, in accordance with some embodiments, the configuration can disable adjusting some control knobs when looking to reduce consumption.

At operation 304, the AP can receive threshold values for various usage parameters of the AP. The threshold values can be used to determine when to trigger ES mode. Threshold values for a time-of-use parameter, for example, can be used to designate windows of time when ES measures can be enacted or not. As noted above, energy saving measures in accordance with the present disclosure can involve altering the functionality of the AP. Accordingly, in some embodiments, ES measures can be disabled during business hours to avoid disrupting workflow. Conversely, ES measures can be enabled only during certain off-hours (e.g., late evening, weekends, holidays, etc.) when network traffic is expected to be light.

In some embodiments, the time-of-use parameter can be applied on a per function basis. For instance, an ES action of reducing transmission power (Tx power) may be subject to certain windows of time when the action is allowed, while an ES action of disabling USB capability may be subject to other windows of time.

At operation 306, the AP can measure (sample) various usage parameters on a repeated basis. In some embodiments, usage parameters can be monitored and collected periodically, on a user-defined schedule, and so on. In some embodiments, the measurement frequency can vary from one usage parameter to another.

At decision point 308, the AP can evaluate the collected measurements to determine whether to enter ES mode (reduced-power mode, etc.) to reduce power consumption. One consideration, for example, is whether ES mode for the AP is enabled for the current time of the day, day of the week, etc. based on user-provided time-of-use thresholds. Evaluating the collected measurements can include considerations such as comparing various usage parameters against their corresponding threshold values. For example, if the number of active clients exceeds a given threshold value, then ES measures should not be invoked so that the AP has all of its functionality enabled to handle its clients.

In some embodiments, the criteria for switching to ES mode can be based on the most recent measurement (sample) of a given usage parameter. In other embodiments, the last N samples of a parameter can be used as a criterion for determining whether to enter ES mode or not. For example, the last N samples of a usage parameter can be averaged and a decision on ES mode can be based on the average.

In some embodiments, the criteria for deciding ES mode can be based on a per radio basis, or on a per AP basis. Consider the number of clients, for instance. ES mode can be decided based on the number of clients associated with a given radio (e.g., 2.4 GHz radio), or based on the number of clients associated with the AP as a whole (i.e., total number of clients across all radios).

In some embodiments, the criteria to enter ES mode can be based on combinations of usage parameters.

In some embodiments, criteria other than usage parameters can trigger ES mode such as network conditions. For example, if the AP detects some number of neighbor APs, then certain ES measures can be taken.

Merely to illustrate this aspect of the present disclosure, TABLE I below provides a non-exhaustive list of examples of various criteria for scaling back AP functionality to enter ES mode.

At operation 310, the AP can enact ES measures to enter ES operating mode. In some embodiments, the AP can adjust one or more control knobs (non-exhaustive examples listed above) to reduce its power consumption. In some embodiments, certain environmental criteria may be required before entering ES mode. For example, a criterion for turning off a 2.4 GHz radio can be that two or more neighbor APs have their 2.4 GHz radios on. Merely to illustrate this aspect of the present disclosure, TABLE I below provides a non-exhaustive list of examples of ES measures to enter ES mode.

At operation 312, the AP can continue to measure (sample) various usage parameters on a repeated basis when in ES mode. In some embodiments, the AP can restore full-function operation (exit ES mode) based on measurements made subsequent to entering ES mode. In some embodiments, a different set of thresholds can be used to determine when to exit ES mode than were used to enter ES mode.

At decision point 314, the AP can determine whether to resume full AP functionality, thereby exiting ES mode by adjusting one or more control knobs to restore functionality in the AP. In some embodiments, for example, resuming or otherwise restoring full AP functionality can occur in response to the absence of the criterion or criteria that provoked ES mode to begin with. For example, suppose a usage parameter exceeding a threshold invoked ES mode to reduce AP functionality, then when that usage parameter falls below the threshold, the reduced AP functionality can be reversed to exit ES mode. In some embodiments, exiting ES mode can be based on the expiration of a timer; e.g., we can exit ES mode after the passage of some number of minutes subsequent to entering ES mode. TABLE I below provides a non-exhaustive list of some examples of criteria for exiting ES mode by increasing or otherwise restoring AP functionality.

At operation 316, the AP can reverse some ES measures to restore functionality in the AP. In some embodiments, to prevent over-aggressive entry and exit of ES mode, the AP can delay for an amount of time after the criteria (conditions) for ES mode have been met before enacting ES measure, and likewise delay for a period of time after the criteria that triggered ES mode no longer exist before restoring functionality in the AP. In other words, the criteria for entering ES mode may have to persist for a period of time before going into ES mode. In some embodiments, for example, the decision to switch to ES mode can be regulated by timers. For example, when the criteria for switching to ES mode are met, a timer can be started. If the criteria hold when the timer expires, the AP can switch to ES mode.

Conversely, the condition(s) that triggered ES mode may need to be absent for some period of time before switching out of ES mode. In some embodiments, switching out of ES mode (e.g., back to full-function mode) can be regulated by timers. For example, the AP can re-evaluate the criteria that caused ES mode, for example by periodically sampling the usage parameters. If the criteria no longer hold, the AP can switch back to full-function mode.

In some embodiments, some of the control knobs can be adjusted in stepwise fashion. For example, the channel bandwidth may be initially 320 MHz and iteratively reduced to 20 MHz when switching to ES mode. The speed of the iterative reduction can be regulated by timers; e.g., by halving the bandwidth with each iteration every n seconds; for example, from 320 to 160 to 80 to 40 to 20 MHz every five seconds. Conversely, on exiting ES mode, the channel bandwidth may be increased in steps; e.g., by doubling the bandwidth from 20 MHz to 320 MHz every so many seconds.

The following table provides a non-exhaustive illustrative list of criteria for switching to and out of ES mode with corresponding examples of actions to enter and exit ES mode:

TABLE I

| Criteria (Conditions) | Actions |
|---|---|
| Time of the day is between T1 and T2 (for example, 7pm to 6am) | Enable power-saving actions. In some embodiments, we can specify explicit periods of time when ES mode processing is enabled. |
| Time of the day is between T3 and T4 (for example, 6am to 7pm) | Disable power saving actions. In some embodiments, we can specify explicit periods of time when ES mode processing is disabled. |
| Exit ES mode time period, T5 (for example, 5 minutes) | Exit ES mode after expiration of time period T5, irrespective of the reason for entering ES mode. |
| 1. Nc < Nc_th1 (total number of active clients on the AP is deemed low) AND<br>2. Et < Et_th1 AND<br>3. Bo < Bo_th1<br>Nc—number of active clients on the AP<br>Nc_th1—Nc threshold (e.g., 10)<br>Et—Ethernet link utilization (e.g., where both the uplink and downlink throughputs, averaged over N intervals, fall below a user-defined threshold value)<br>Et_th1—Et threshold (user-defined threshold value)<br>Bo—buffer occupancy (e.g., where both the uplink and downlink buffers, averaged over N intervals, fall below a user-defined threshold value)<br>Bo_th1—Bo threshold (user-defined threshold value) | 1. Deny MLO requests/Disable MLO (multi-link operation)<br>2. Reduce Tx/Rx chains by a factor of 2 if the number of Tx/Rx chains >2<br>3. If the 6 GHz maximum operating bandwidth is ≥40 MHz, reduce the maximum allowed bandwidth by half<br>4. Disable SR (spatial reuse)<br>5. For clients using Wi-Fi 6 or higher generations, allow only TWT-based operation (target wait time)<br>6. If PoE switch is providing maximum power, renegotiate a lower PoE power<br>[With a small total number of clients and low traffic, quality of service (QoS) requirements can be met without MLO and full MU-MIMO (multiuser, multiple input, multiple output). The AP does not need full PoE power.<br>In the 6 GHz band, reducing channel bandwidth results in a corresponding decrease in the max operating transmit power. Disabling SR results in energy-saving because SR can incur memory and computation costs. Operating only in TWT mode can result in a more deterministic, scheduled network, thereby reducing contention overheads and saving energy.] |
| 1. Nc > Nc_th2 (total number of active clients on the AP is not deemed low) OR<br>2. Et > Et_th2 OR<br>3. Bo > Bo_th2 | 1. Allow MLO requests/Enable MLO<br>2. Increase Tx/Rx chains by 1 until max number of Tx/Rx chains is reached<br>3. Double the 6 GHz max allowed bandwidth until max limit is reached<br>4. Enable SR<br>5. Allow non-TWT based operation<br>6. If POE switch is not providing maximum power, renegotiate to provide max PoE power |

TABLE I-continued

| Criteria (Conditions) | Actions |
|---|---|
| | [There is enough traffic or number of clients to warrant reversing the above ES actions to restore AP functionality.] |
| 1. Self-Channel utilization is less than ch_util_th1 (e.g., 25%) AND<br>2. Channel bandwidth is >20 MHz AND<br>3. MU-MIMO clients count < mumimo_th1 (e.g., 25%) AND<br>4. OFDMA clients count > ofdma_th1 (e.g., 50%) | Reduce Tx/Rx chains by a factor of 2 if the number of Tx/Rx chains >2<br>[If MU-MIMO use is low/moderate while OFDMA (orthogonal frequency-division multiple access) use is moderate/heavy, the impact of reducing chains can be mitigated if wider channels (e.g., 40/80 MHZ) are used.] |
| 1. Self-Channel utilization is less than ch_util_th2 (e.g., 10%) AND<br>2. No. of co-channel APs < ap_cc_th1 (e.g., 5) | 1. Deny MLO requests/Disable MLO<br>2. Reduce Tx/Rx chains by a factor of 2 if the number of Tx/Rx chains >2<br>3. If POE switch is providing maximum power, renegotiate a lower PoE power<br>[Low channel utilization with a moderate/high number of co-channel neighbors indicates that the AP is lightly loaded. Turning off Tx/Rx chains and MLO can reduce power consumption with little impact on overall performance.] |
| 1. If Self-Channel utilization > ch_util_th3 (e.g., 25%) AND<br>2. total utilization > ch_util_th4 (e.g., 90%) AND<br>3. MU-MIMO clients > mumimo_th2 (e.g., 30%) | 1. Increase of Tx/Rx chains by 1 until max limit is reached<br>2. Allow MLO requests/Enable MLO<br>3. If PoE is below max, renegotiate the max PoE power with the switch<br>[There is enough traffic or number of clients to warrant reversing the above ES actions to restore AP functionality.] |
| Wired Interface Tx packet (errors + overruns) > wired_th1 (e.g., 25% of total packets) | 1. Reduce Tx/Rx chains by a factor of 2 if the number of Tx/Rx chains >2<br>2. If the 6 GHz operating bandwidth is >20 MHZ, reduce the maximum allowed bandwidth by half<br>[Tx packet errors and overruns indicate traffic congestion (assuming quality of networking is good). If the AP cannot push the data out to the wired network, we can save power and reduce load on the wired side.] |
| Wired Interface Tx packet (errors + overruns) < wired_th2 (e.g., 10%) | 1. Increase of Tx/Rx chains by 1 until max limit is reached<br>2. Double the 6 GHz max allowed bandwidth until max limit is reached |
| 1. MU-MIMO is disabled AND<br>2. Average no. of SS (spatial streams) ≤ (Num. of Tx/Rx chains/4) | Reduce Tx/Rx chains by a factor of 2 if the number of Tx/Rx chains >2<br>[When only SU-MIMO (single-user MIMO) is enabled but the average number of SS supported by clients is low, reduction in Tx/Rx chains will not impact throughout significantly but will realize savings in power.] |
| 1. SU-MIMO clients count < sumimo_th1 (e.g., 50%) AND<br>2. Ethernet negotiated link rate < Peak PHY rate/2 | 1. Reduce Tx/Rx chains by a factor of 2 if the number of Tx/Rx chains >2<br>2. If the 6GHz operating bandwidth is >20 MHZ, reduce the maximum allowed bandwidth by half<br>[When the Ethernet link is not able to match the peak PHY rate (physical layer), reducing the no. of chains and the 6 GHz bandwidth will not significantly impact the overall throughput, but will reduce power consumption.] |
| 1. SU-MIMO clients count > sumimo_th2 (e.g., 50%) OR<br>2. Ethernet negotiated link rate > Peak PHY rate/2 | 1. Increase of Tx/Rx chains by 1 until max limit is reached<br>2. Double the 6 GHz max allowed bandwidth until max limit is reached |
| 1. No. of connected clients on 2.4 GHz radio = 0 AND<br>2. No. of Neighbor APs with 2.4 GHz radio ON >2 | 1. Turn off 2.4 GHz radio<br>2. If PoE is at its max, renegotiate a lower PoE power with the switch<br>[With no active 2.4 GHz clients, the single-band clients will be able to connect with one of the neighboring APs.] |
| No. of visible, 2.4 Ghz-only clients with (RSSI >−60 dBm) > nc_2.4_th1 (e.g., 5) | 1. Turn on 2.4 GHz radio<br>2. If PoE is below max, renegotiate the max PoE power with the switch<br>[If there are clients that are 2.4 GHz capable only.] |
| 1. No. of connected clients on 2.4 GHz radio >0 AND<br>2. Multi-band clients > nc_multi_th1 (e.g., 50%) AND<br>3. No. of Neighbor APs with 2.4 GHz radios on >2 | 1. Turn off 2.4 GHz radio<br>2. If PoE is at its max, renegotiate a lower PoE power with the switch<br>[If there are clients on the 2.4 GHz radio but most of them are multi-band capable, it can be turned off. The single-band clients will be able to connect with one of the neighboring APs.] |

TABLE I-continued

| Criteria (Conditions) | Actions |
| --- | --- |
| No. of visible, 2.4 Ghz-only clients (with RSSI >−60 dBm) is > nc_2.4_th2 (e.g., 25%) of total visible clients | 1. Turn on 2.4 GHz radio<br>2. If PoE is below max, renegotiate the max PoE power with the switch<br>[The AP can take this ES action if there is a significant number of clients that are 2.4 GHz capable only.] |
| 1. Nc < Nc_th1: Total number of active clients on the 5 GHz radio and the 6 GHz radio is low AND<br>2. (Et < Et_th1 and Bo < B_th1) is true for both uplink and downlink | 1. Turn off the 6 GHz radio<br>2. If PoE is at its max, renegotiate a lower PoE power with the switch<br>[If the total number of multi-band clients is low and the traffic is low, the 5 GHz radio can support all clients. The 6 GHz radio can be turned off to save power.] |
| 1. Number of visible 6 GHz-capable clients (with RSSI >−60 dBm) is > Nc_6_th1 (e.g., 15) OR<br>2. (Et > Et_th2 or Bo > B_th2) is true for either uplink or downlink | 1. Turn on 6 GHz radio<br>2. If PoE is below max, renegotiate the max PoE power with the switch |
| 1. An AP has no active clients on any radio for N measurement intervals AND<br>2. At least K (e.g., 4) neighboring APs are visible with 2.4 GHz and 5 GHz RSSI >−60 dBm | 1. Turn off all radios of the AP<br>2. If PoE is at its max, renegotiate a lower PoE power with the switch |
| 1. One or more neighbor APs has clients with low RSSI (e.g., RSSI <−70 dBm) OR<br>2. Number of clients visible to a neighbor AP > Nth (e.g., 25) | 1. Turn on all radios of the AP<br>2. If PoE is below max, renegotiate the max PoE power with the switch |
| 1. AP is in Dual-5 GHz mode AND<br>2. Nc < Nc_5_th1: Combined number of active clients on both 5 GHz radios is low (e.g., <10) AND<br>3. (Et < Et_th1 and Bo < B_th1) is true for both uplink and downlink | Turn off one 5 GHz radio<br>[With a small total number of 5 GHz clients and low traffic, the AP can turn off one of the 5GHz radios to save power.] |
| 1. AP is in dual-5 GHz mode AND<br>2. No. of connected clients on the active 5 GHz radio > nc_5_th2 (e.g., 10) OR<br>3. (Et >Et_th2 and Bo >B_th2) is true for either uplink or downlink | Turn on the second 5 GHz radio<br>[If one 5 GHz radio is loaded, the second one is turn on to meet capacity requirements, thereby restoring functionality.] |
| Bluetooth clients = 0 | Reduce the periodicity of BLE beacons by factor of 2<br>[When there are no BLE clients for a sufficiently long period of time, the rate at which beacons are sent can be reduced to save power.] |
| 1. USB device >1 AND<br>2. At least one connected USB device belongs to high power category and it is not a communication/network device (e.g., cellular modem) | Turn off USB<br>[If there is a connected device, the USB port can be turned off to save power.] |
| 1. Average RSSI of clients is at least 3 dB above the MinAssocRSSI AND<br>2. AP has at least 3 RF neighbors visible above (MinAssocRSSI + 6 dB) on each radio AND<br>3. No. of neighbor APs per radio >=2 | Reduction of AP Tx power in steps of 3 dB<br>[If most of the clients are well above the min RSSI threshold and clients can see 2 other APs on average and the AP has multiple neighbors with sufficiently high RSSI, then a reduction in Tx power will push the cell-edge clients to the neighbor APs, thus preserving connectivity while at the same time reducing the AP's power consumption.] |
| 1. User has included BG Scan (Background Scanning) as an ES-mode control AND<br>2. User has enabled ES-mode based on time-of-the-day | Turn off the multifunction radio |

FURTHER EXAMPLES

Features described above as well as those claimed below may be combined in various ways without departing from the scope hereof. The following examples illustrate some possible, non-limiting combinations:

(A1) A method for reducing power consumption by an access point (AP) device, the method including: making measurements of one or more usage parameters of the AP; based on comparisons between the measurements of the one or more usage parameters and respective threshold values corresponding to the one or more usage parameters, switching from a full-function operating mode to a reduced functionality mode by adjusting one or more operating parameters of the AP from first respective operating states to second respective operating states; making additional measurements of the one or more usage parameters; and based on comparisons between the additional measurements of the one or more usage parameters and the respective threshold values corresponding to the one or more usage parameters, switching from the reduced functionality mode to an increased functionality mode by adjusting the one or more operating parameters of the AP from the second respective operating states to the first respective operating states.

(A2) For the method denoted as (A1), the increased functionality mode is the full-functioning operating mode.

(A3) The method denoted as any of (A1) through (A2), further including switching to the ES operating mode upon passage of a period of time after occurrence of one or more conditions that are determined based on the measurements of the one or more usage parameters.

(A4) For the method denoted as any of (A1) through (A3), switching from the reduced functionality mode to the increased functionality mode occurs upon passage of a period of time after the one or more conditions are no longer present.

(A5) For the method denoted as any of (A1) through (A4), switching between the reduced functionality mode and the increased functionality mode is enabled during one or more predefined times.

(A6) For the method denoted as any of (A1) through (A5), the AP operating in the ES operating mode provides less functionality and/or capacity than in full-function operating mode.

(A7) For the method denoted as any of (A1) through (A6), making measurements of the one or more usage parameters includes obtaining n measurements of a first usage parameter and computing a first value of the first usage parameter based on the n measurements of the first usage parameter, wherein entering ES operating mode is based at least on the first value.

(A8) For the method denoted as any of (A1) through (A7), the one or more usage parameters includes any one or any combination of two or more of: a number of clients associated with the AP, a buffer occupancy of the AP, an Ethernet link utilization of the AP, and a channel utilization of the AP.

(A9) For the method denoted as any of (A1) through (A8), the one or more operating parameters of the AP include any one or any combination of two or more of: radio state, USB state, BLE state, a number of Tx/Rx chains, protocol, software feature, transmit power level, PoE power level, and channel bandwidth.

(B1) An AP (access point) device including: one or more computer processors; and a computer-readable storage medium. The computer-readable storage medium having instructions for controlling the one or more computer processors to: operate the AP device in a first operating mode; make measurements of one or more usage parameters while operating the AP device in the first operating mode; and operate the AP device in a second operating mode in response to a presence of one or more conditions determined based on the one or more usage parameters. wherein the one or more usage parameters comprise parameters that relate to functions that can be performed by the AP and capacity of the AP device.

(B2) For the AP denoted as (B1), switching from the first operating mode to the second operating mode is enabled only during one or more user-defined periods of time.

(B3) For the AP denoted as any of (B1) through (B2), the computer-readable storage medium further includes instructions for controlling the one or more computer processors to switch to the second operating mode subsequent to passage of a period of time after occurrence of the one or more conditions.

(B4) For the AP denoted as any of (B1) through (B3), the computer-readable storage medium further includes instructions for controlling the one or more computer processors to switch back from the second operating mode to the first operating mode in incremental steps.

(B5) For the AP denoted as any of (B1) through (B4), the first operating mode is a full-function operating mode and the second operating mode is an energy-saving operating mode that provides fewer functions and/or less capacity than the full-function mode.

(C1) A method in a network device, the method including: operating the network device in a full-function operating mode; making measurements of one or more usage parameters while operating the network device in the full-function operating mode; operating the network device in an energy-saving (ES) operating mode in response to a presence of one or more conditions determined based on the one or more usage parameters, wherein the one or more usage parameters comprise parameters that relate to functions that can be performed by the network device and capacity of the network device; and switching back to operating the network device in the full-function operating mode when the one or more conditions are no longer present.

(C2) For the method denoted as (C1), operating the network device in the ES operating mode is enabled only during user-defined periods of time.

(C3) The method denoted as any of (C1) through (C2), further including switching from the full-function operating mode to the ES operating mode subsequent to passage of a period of time after determining the presence of the one or more conditions.

(C4) The method denoted as any of (C1) through (C3), further including switching back to operating the network device in the full-function operating mode subsequent to passage of a period of time after the one or more conditions is no longer present.

(C5) For the method denoted as any of (C1) through (C4), the ES operating mode provides fewer functions and/or less capacity than the full-function mode.

(C6) For the method denoted as any of (C1) through (C5), the one or more usage parameters includes any one or any combination of two or more of: a number of clients associated with the AP, a buffer occupancy of the AP, an Ethernet link utilization of the AP, and a channel utilization of the AP.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for reducing power consumption by an access point (AP), the AP including a plurality of radios operating in different radio frequency bands, the method comprising:
- for each radio in the plurality of radios:
  - making measurements of one or more radio usage parameters pertaining to the radio and/or one or more other radios in the plurality of radios;
  - based on at least a portion of the measurements of the one or more radio usage parameters, adjusting one or more operating parameters of the radio from first respective operating states to second respective operating states, wherein the first respective operating states correspond to a full-function operating mode and wherein the second respective operating states correspond to a reduced functionality mode;
  - making additional measurements of the one or more radio usage parameters pertaining to the radio and/or the one or more other radios;
  - based on at least a portion of the additional measurements of the one or more radio usage parameters, adjusting the one or more operating parameters of the radio from the second respective operating states to third respective operating states corresponding to an increased functionality mode; and
  - making measurements of one or more wired interface usage parameters pertaining to one or more wired interfaces of the AP, wherein:
  - the adjusting of the one or more operating parameters of the radio from the first respective operating states to the second respective operating states is further based on the measurements of the one or more wired interface usage parameters, and the adjusting of the one or more operating parameters of the radio from the second respective operating states to the third respective operating states is further based on the measurements of the one or more wired interface usage parameters.

2. The method of claim 1, wherein the increased functionality mode is the full-function operating mode.

3. The method of claim 1, wherein the adjusting of the one or more operating parameters of the radio from the first respective operating states to the second respective operating states is performed upon passage of a period of time after occurrence of one or more conditions that are determined based on the measurements.

4. The method of claim 3, wherein the adjusting of the one or more operating parameters of the radio from the second respective operating states to the third respective operating states is performed upon passage of a period of time after the one or more conditions are no longer present.

5. The method of claim 1, wherein the adjusting of the one or more operating parameters of the radio from the first respective operating states to the second respective operating states is only allowed during one or more predefined times.

6. The method of claim 1, wherein the AP operating in the reduced functionality mode provides less functionality and/or capacity than in the full-function operating mode.

7. The method of claim 1, wherein making measurements of the one or more radio usage parameters pertaining to the radio and/or the other radios includes obtaining n measurements of a first radio usage parameter and computing a first value of the first radio usage parameter based on the n measurements of the first radio usage parameter, and wherein the adjusting of the one or more operating parameters of the radio from the first respective operating states to the second respective operating states is based at least on the first value.

8. The method of claim 1 wherein the one or more radio usage parameters comprise at least one of: a number of neighbor APs operating on a same frequency band as the radio, a number of clients associated with the AP via the radio, a channel utilization of the radio, or whether two or more of the plurality of radios are operating on a same frequency band.

9. The method of claim 1 further comprising:

making measurements of one or more Ethernet usage parameters pertaining to one or more Ethernet links of the AP, wherein the adjusting is further based on the measurements of the one or more Ethernet usage parameters.

10. The method of claim 9 wherein the one or more Ethernet usage parameters includes an uplink throughput of an Ethernet link, a downlink throughput of an Ethernet link, a buffer occupancy of an uplink or downlink buffer for an Ethernet link, or a negotiated link rate for an Ethernet link.

11. The method of claim 1 wherein the adjusting is further based on one or more control knob configurations that specify:

the one or more operating parameters of the radio that may be adjusted; and adjustment ranges or limits for the one or more operating parameters of the radio.

12. The method of claim 11 wherein the one or more control knob configurations specify that the one or more operating parameters of the radio that may be adjusted include the radio's on/off state, a number of transmit and receive chains used by the radio, a transmit power of the radio, or a channel bandwidth of the radio.

13. An AP (access point) device comprising:

a plurality of radios operating in different radio frequency (RF) bands;

one or more computer processors; and a computer-readable storage medium comprising instructions for controlling the one or more computer processors to, for each radio in the plurality of radios:

make measurements of one or more radio usage parameters pertaining to the radio and/or one or more other radios in the plurality of radios;

in response to a presence of a set of conditions including one or more first conditions that are determined based on at least a portion of the measurements of the one or more radio usage parameters, adjust one or more operating parameters of the radio from first respective operating states to second respective operating states, wherein the first respective operating states correspond to a first operating mode of the AP device and wherein the second respective operating states correspond to a second operating mode of the AP device; and making measurements of one or more wired interface usage parameters pertaining to one or more wired interfaces of the AP, wherein the adjusting is further based on the measurements of the one or more wired interface usage parameters.

14. The AP device of claim 13, wherein the set of conditions further include one or more second conditions that are determined based on one or more user-defined periods of time.

15. The AP device of claim 13, wherein the one or more operating parameters of the radio are adjusted subsequent to passage of a period of time after occurrence of the set of conditions.

16. The AP device of claim 13, wherein the computer-readable storage medium further comprises instructions for controlling the one or more computer processors to adjust the one or more operating parameters of the radio from the second respective operating states back to the first respective operating states in incremental steps.

17. The AP device of claim 13, wherein the first operating mode is a full-function operating mode and the second operating mode is an energy-saving operating mode that provides fewer functions and/or less capacity than the full-function operating mode.

18. The AP device of claim 13, wherein the one or more radio usage parameters comprise at least one of: a number of neighbor APs operating on a same frequency band as the radio, a number of clients associated with the AP via the radio, a channel utilization of the radio, or whether two or more of the plurality of radios are operating on a same frequency band.

19. A method in a access point (AP) device including a plurality of radios operating in different radio frequency (RF) bands, the method comprising, for each radio in the plurality of radios:

making measurements of one or more radio usage parameters pertaining to the radio and/or one or more other radios in the plurality of radios;

in response to a presence of a set of conditions including one or more first conditions that are determined based on at least a portion of the measurements of the one or more radio usage parameters, adjusting one or more operating parameters of the radio from first respective operating states to second respective operating states, wherein the first respective operating states correspond to a full-function operating mode of the AP device and wherein the second respective operating states correspond to an energy saving (ES) operating mode of the AP device;

adjusting the one or more operating parameters of the radio from the second respective operating states back to the first respective operating states when at least a portion of the set of conditions is no longer present; and making measurements of one or more wired interface usage parameters pertaining to one or more wired interfaces of the AP, wherein :

the adjusting of the one or more operating parameters of the radio from the first respective operating states to the second respective operating states is further based on the measurements of the one or more wired interface usage parameters, and the adjusting of the one or more operating parameters of the radio from the second respective operating states to the third respective operating states is further based on the measurements of the one or more wired interface usage parameters.

20. The method of claim 19, wherein the set of conditions further include one or more second conditions that are determined based on user-defined periods of time.

21. The method of claim 19, wherein the one or more operating parameters of the radio are adjusted from the first respective operating states to the second respective operating states subsequent to passage of a period of time after determining the presence of the set of conditions.

22. The method of claim 19, wherein the one or more operating parameters of the radio are adjusted from the second respective operating states back to the first respective operating states subsequent to passage of a period of time after the portion of the set of conditions is no longer present.

23. The method of claim 19, wherein the ES operating mode provides fewer functions and/or less capacity than the full-function operating mode.

24. The method of claim 19, wherein the one or more radio usage parameters comprise at least one of: a number of neighbor APs operating on a same frequency band as the radio, a number of clients associated with the AP via the radio, a channel utilization of the radio, or whether two or more of the plurality of radios are operating on a same frequency band.

* * * * *